United States Patent [19]
Herlihy

[11] Patent Number: 5,934,166
[45] Date of Patent: Aug. 10, 1999

[54] CUTTING APPARATUS FOR WORKPIECES WITH A THIN WALLED CROSS SECTION

[75] Inventor: Dennis F. Herlihy, 21410 W. Valley Dr., New Berlin, Wis. 53146

[73] Assignees: Dennis F. Herlihy; John Herlihy, both of West Patterson, N.J.

[21] Appl. No.: 08/989,064

[22] Filed: Dec. 11, 1997

[51] Int. Cl.[6] .............................. B26D 5/08; B23D 23/00
[52] U.S. Cl. ................... 83/605; 83/622; 83/633; 83/694
[58] Field of Search ................ 83/605, 599, 606, 83/622, 694, 164, 633

[56] References Cited

U.S. PATENT DOCUMENTS

| | | | |
|---|---|---|---|
| 392,662 | 11/1888 | Carnahan | 83/694 |
| 728,475 | 9/1929 | Cavill | 83/633 |
| 834,887 | 11/1906 | Calhoun | 83/694 |
| 1,049,676 | 1/1913 | Cousins et al. | 83/633 |
| 1,402,019 | 1/1922 | Schmitz | 83/605 |
| 2,355,320 | 8/1944 | Nebel | 83/605 |
| 2,760,575 | 8/1956 | Taylor | 83/164 |
| 3,457,818 | 7/1969 | McManus | 83/599 |
| 3,714,856 | 2/1973 | Hall et al. | 83/605 |
| 4,130,037 | 12/1978 | Matthews | 83/694 |
| 4,364,292 | 12/1982 | Wozniak et al. | 83/605 |
| 4,576,380 | 3/1986 | Shields | 83/605 |

*Primary Examiner*—M. Rachuba
*Assistant Examiner*—Sean Pryor
*Attorney, Agent, or Firm*—Kirkpatrick & Lockhart LLP

[57] ABSTRACT

A cutting apparatus is disclosed for cutting a workpiece. The cutting apparatus includes a base that includes a support to support the workpiece, and a cutting blade pivotally connected to the base that includes a first cutting edge and a second cutting edge. The cutting apparatus further includes an operator connected to the cutting blade to operate the cutting blade to cut the workpiece.

21 Claims, 4 Drawing Sheets

CUTTING APPARATUS FOR WORKPIECES WITH A THIN WALLED CROSS SECTION

BACKGROUND OF THE INVENTION

1. Field of the Invention

The present invention relates to apparatuses useful for cutting a workpiece. More particularly, the present invention relates to cutting apparatuses useful for cutting workpieces such as shaped metallic strips.

2. Description of the Invention's Background

There are two major standards for devices that enable the mounting of electrical components within an electrical control panel or center, the National Electrical Manufacturing Association (NEMA) standard and the International Electrotechnical Commission (IEC) standard. Under the NEMA standard, which historically has been followed most often in the United States, each electrical component in an electrical control panel or center is bolted into the panel or center. Under the IEC standard, which historically has been followed most often in Europe, one or more DIN rails are bolted into an electrical control panel or center and electrical components are snapped onto the DIN rails. The acronym DIN stands for Deutsches Institut fur Normung. It is a German standard for rails used throughout Europe.

Often many electrical components are located within one control panel or center, and many such components may be snapped onto one length of DIN rail under the IEC standard. Use of the IEC standard thus can save a manufacturer of control panels or centers, or of equipment having control panels or centers, a significant amount of assembly time as compared to use of the NEMA standard. Accordingly, while the NEMA standard historically has been more dominant in the United States, more and more U.S. manufacturers are beginning to manufacture in accordance with the IEC standard, such that the IEC standard appears to be becoming the dominant standard in the world.

Use of the IEC standard does give rise to a problem, however. DIN rail generally has a nonlinear, relatively complex, thin-walled cross-section, such as the DIN rail cross-sections shown on page 15 of the IBOCO 1995 general catalog, because DIN rail must present surfaces around which electrical components may be snapped. DIN rail normally is manufactured in 6 or 8 foot lengths, and must be cut down to the needed size by a panel or equipment manufacturer assembling an electrical panel or center. Because of the irregular shape of DIN rail, it is difficult if not impossible to cleanly and accurately cut DIN rail without deforming the DIN rail using standard metal shears or cutting tools. Sections of DIN rail to be mounted in a panel may be as small as one inch (25.4 mm) long, and may need to be cut cleanly to within about $1/16$" (1.6 mm) to $1/32$" (0.8 mm).

A clean, accurate and non-deforming cut is considered to be very important by manufacturers that produce control panels or centers as final products or as parts of final products. It is considered important by such manufacturers that control panels and centers have a very clean look for their customers, and thus that DIN rails extend up to but not beyond the edges of components mounted thereon, and have clean rather than rough, deformed or jagged edges. Deformed DIN rail edges additionally are disadvantageous because they, can cause components not to fit well on the DIN rail, and DIN rails that are deformed more than about 0.01 inch (0.25 mm) generally are not used by the manufacturers. Producing a clean, undeformed and accurate length of DIN rail becomes especially difficult when a length has already been cut to slightly too long a length, and must be trimmed to the correct length.

As stated above, various standard metal-cutting devices are known for cutting or punching metal sheets or strips. For example, U.S. Pat. No. 990,636 to Dalbey, U.S. Pat. No. 2,355,320 to Nebel, U.S. Pat. No. 3,996,831 to Gale, British Patent Publication No. 632,136 and British Patent Publication No. 904,492 disclose various devices having linear- or curvilinear-edged cutters or punches for cutting or punching metal sheets or strips. Such standard devices generally have the disadvantage, however, that they tend to deform a workpiece such as DIN rail that has a relatively complex, thin-walled cross-sectional shape, especially when a short length or the trimming of a length is required.

Other devices are known that are specifically designed to cut complex strip shapes. For example, U.S. Pat. No. 4,457,197 to Wepner, et al. discloses a cutting device wherein an angle section is placed through a die particularly shaped to receive the angle section, and a hydraulically-powered cutting edge is then sheared through the angle section to cut the angle section to a particular length. U.S. Pat. No. 5,142,958 to Nordlin, et al. and pages F-8 and F-9 of the Greenlee Textron Inc. catalog disclose devices specifically designed to cut DIN rail, which all appear to employ a die particularly shaped to receive DIN rail therethrough, and a hydraulically-powered cutter to cut the DIN rail.

Devices of these types, however, generally are relatively expensive and thus tend to be used in a setup, where a large number of DIN rails of a particular length need to be cut. Such devices thus tend to be prohibitively expensive for smaller panel manufacturers that need to cut a wide variety of lengths, with only a small number of each length. Such devices also tend to have the disadvantage, among others, that, because they use a die to support the workpiece on all sides, they obscure the edge being cut from the device operator's sight. The operator thus must guess exactly where to place a length of DIN rail within the device to accurately trim, i.e., less than ½ inch (12.7 mm), from the length, making accurate cuts to within $1/16$" (1.6 mm) to $1/32$" (0.8 mm) difficult.

Because of the difficulty inherent in cleanly and accurately cutting DIN rail, many panel and center manufacturers use a hand-held hacksaw to cut DIN rail, or bundle DIN rail and cut it with a bandsaw. However, the hacksaw method is very time-consuming, and results in rough edges that typically are filed down by hand. The bandsaw method is faster, but often results in some deformation of the DIN rails, and results in rough edges that also are typically filed down by hand. With either method, it is difficult to cut short lengths of DIN rail without deformation, and, if a length of DIN rail is accidentally cut to a wrong size, it is almost impossible to trim the length down by only a small amount. Such lengths now are usually thrown away. At least one DIN rail manufacturer now manufactures scriven DIN rail that is intended to be broken along one of a series of scriven marks, but such rail generally is very difficult to break cleanly, especially when short lengths are required.

In view of the above, it is an object of the present invention to provide an improved cutting apparatus that is capable of readily cutting a workpiece.

It is another object of the present invention to provide a cutting apparatus that is capable of cleanly and accurately cutting a workpiece having a relatively complex, thin-walled cross section.

Yet another object of the present invention is to provide a cutting apparatus that is capable of cutting a workpiece having a relatively complex, thin-walled cross-section with minimal deformation of the workpiece.

A further object of the present invention is to provide a cutting apparatus that is capable of cleanly, accurately and with minimal deformation cutting a short length of a workpiece having a relatively complex, thin-walled cross section.

A further object of the present invention is to provide a cutting apparatus that is capable of cleanly, accurately and with minimal deformation trim a small amount of material from a workpiece having a relatively complex, thin-walled cross section.

SUMMARY OF THE INVENTION

The above objects as well as other objects not specifically enumerated are accomplished by a cutting apparatus for cutting a workpiece in accordance with the present invention. The cutting apparatus of the present invention for cutting a workpiece includes a base that includes a support to support the workpiece, and a cutting blade pivotally connected to the base that includes a first cutting edge and a second cutting edge. The cutting apparatus further includes an operator connected to the cutting blade to operate the cutting blade to cut the workpiece.

The objects of the invention are also accomplished by a cutting apparatus for cutting a workpiece that includes support means for supporting the workpiece, and cutting means, pivotally connected to the support means, for cutting the workpiece, wherein the cutting means including first cutting means for cutting a first portion of the workpiece and second cutting means for cutting a second portion of the workpiece. The cutting apparatus further includes operating means for operating the cutting means to cut the workpiece.

BRIEF DESCRIPTION OF THE DRAWINGS

The preferred embodiment of the present invention will be described in greater detail with reference to the accompanying drawings, wherein like members bear like reference numerals and wherein.

DETAILED DESCRIPTION OF THE PREFERRED EMBODIMENT

Figure 1:
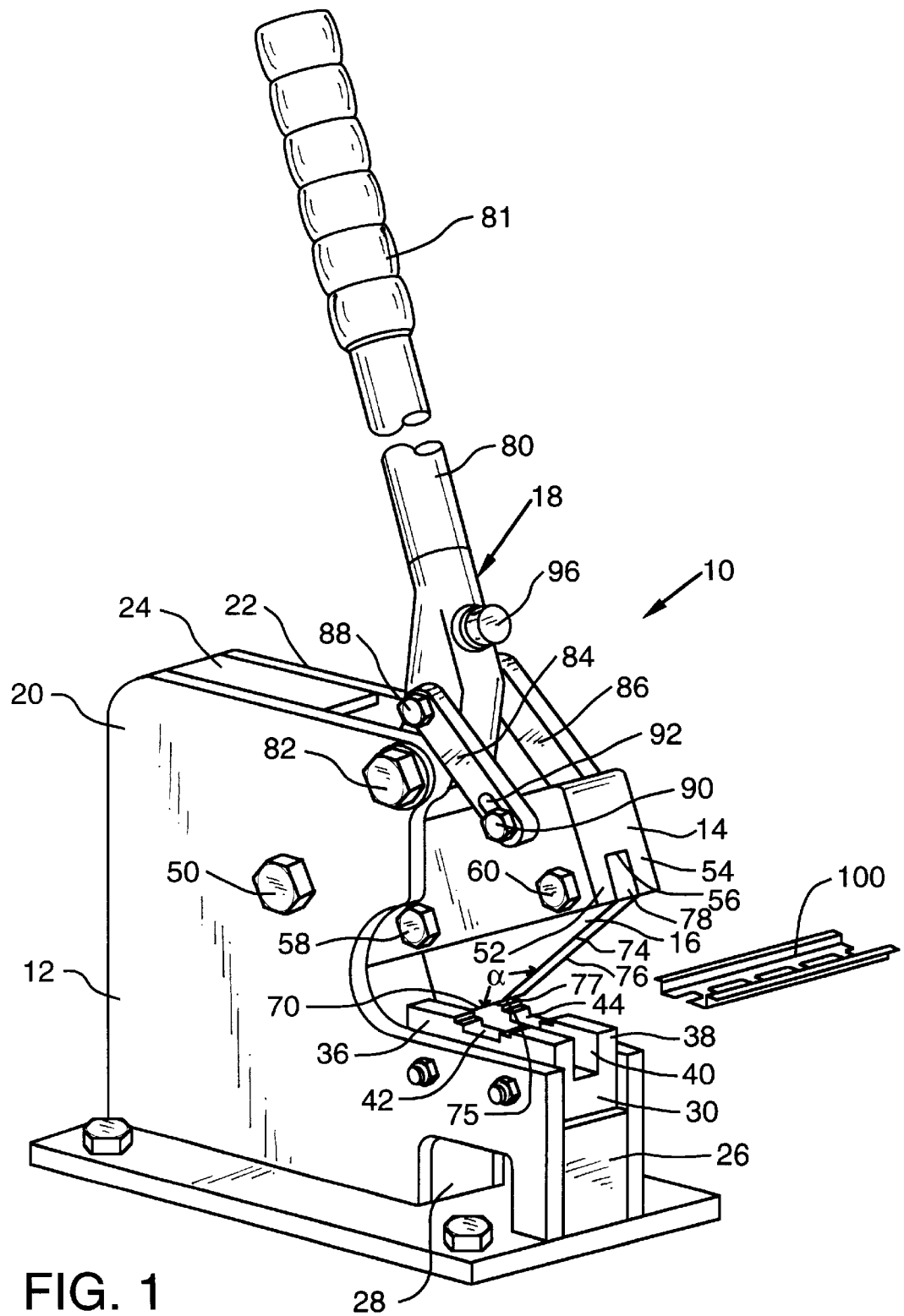
FIG. 1 is a perspective view of a cutting apparatus of the present invention.
Figure 2:
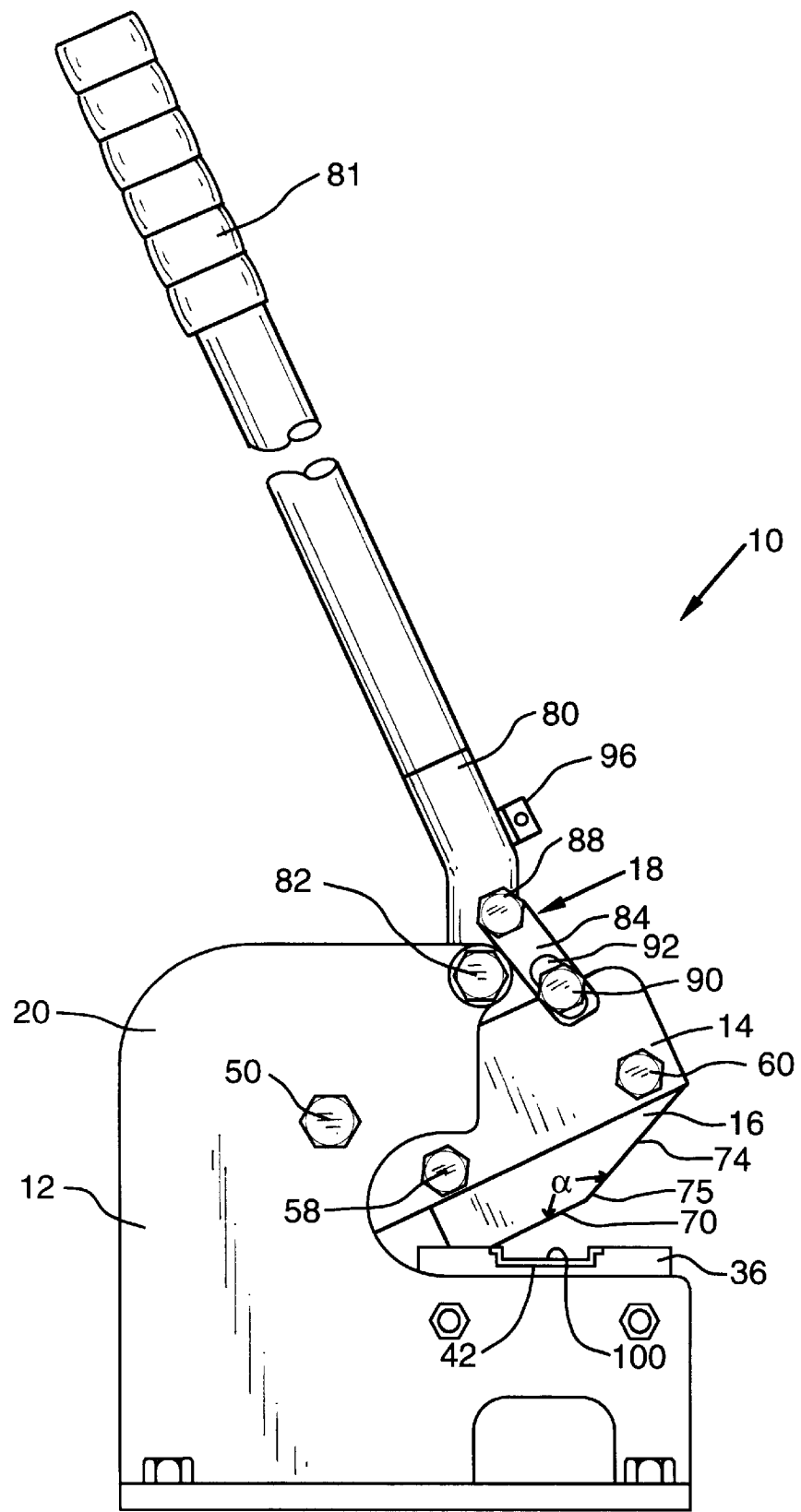
FIG. 2 is a side elevational view of the cutting apparatus of FIG. 1.
Figure 3:
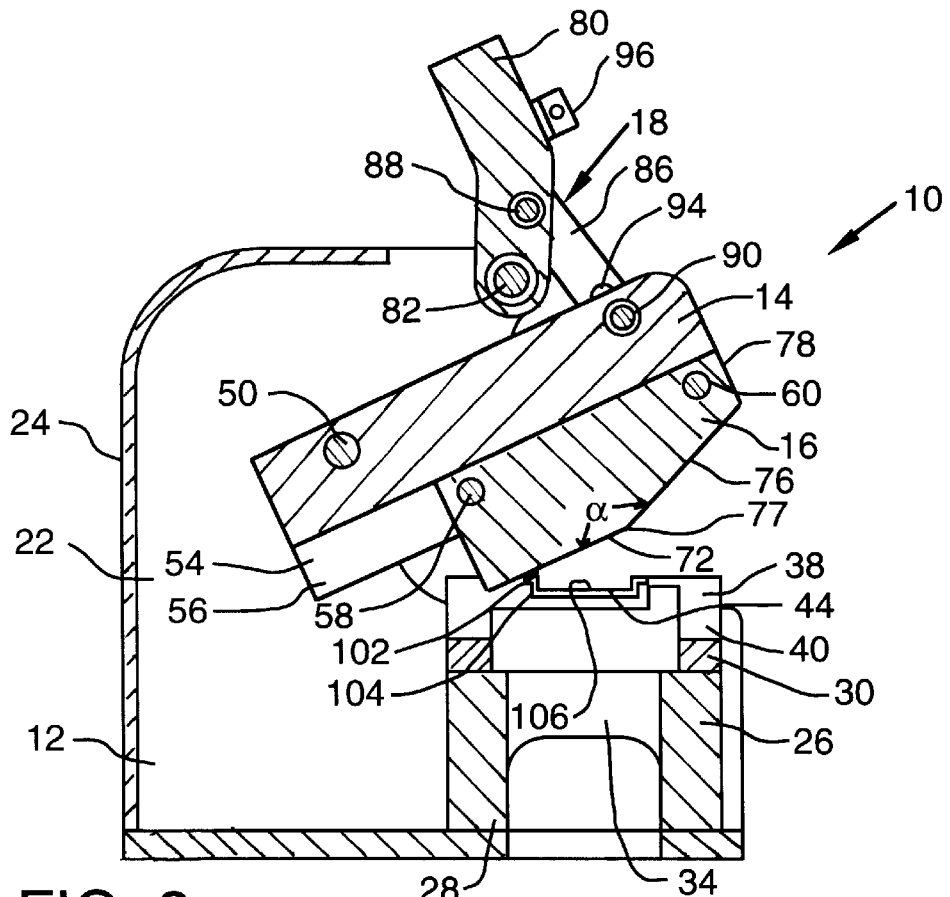
FIG. 3 is a cutaway side elevational view of the cutting apparatus of FIG. 1, prior to commencement of a cut.

With reference to FIGS. 1–7, a cutting apparatus 10 according to the present invention includes a base 12, a ram 14, a cutting blade 16 and an operator 18. As shown in FIGS. 1 and 3, the base 12 includes front and back plates 20, 22, an end plate 24, and a pair of support blocks 26, 28. The base 12 also includes a support 30 for supporting a workpiece having a relatively complex, thin-walled cross section, such as a length 100 of DIN rail. The support 30 includes a slot 34 therein to allow the passage of workpiece scrap therethrough, as will be described in more detail hereinbelow.

The support 30 further includes a pair of support extensions 36, 38 having a blade receiving slot 40 therebetween and a pair of die surfaces 42, 44, respectively, formed therein to support the workpiece. For example, die surfaces 42, 44 are shown as formed to support the length 100 of DIN rail, as will be described in more detail hereinbelow. The support 30 is preferably formed of a tool steel. The inside edges of the support extensions 36, 38 adjacent to which the cutting blade 16 passes are preferably machined to a tolerance within plus or minus 0.001 inch (0.025 mm), heat treated to a hardness of about 58 Rockwell and then surface ground for sharpness.

The ram 14 is pivotally attached to the front and back plates 20, 22 of the base 12 by means of a pin 50. The ram 14 includes a pair of blade support extensions 52, 54 separated by a blade-receiving slot 56, and a pair of pins 58, 60 to secure the cutting blade 16. The cutting blade 16 is mounted within the blade receiving slot 56 by the pins 58, 60, such that the cutting blade 16 is fixed to the ram 14 and thus pivotally connected to the base 12.

As shown in FIGS. 1–3, the cutting blade 16 is made of a tool steel and includes a pair of first cutting edges 70, 72 spaced from each other by the thickness of the cutting blade 16, and a pair of second cutting edges 74, 76 also spaced from each other by the thickness of the cutting blade 16. The thickness of the cutting blade 16 is preferably about 9/32" (7.1 mm), but various other thicknesses of blades may also be successfully employed. The cutting edges 70, 74 and 72, 76, respectively, each meet at a transition points 75, 77, respectively, as will be discussed further hereinbelow. The cutting edges 70, 72, 74, 76 are shown as being straight edges, although curvilinear edges might be advantageously employed for a given workpiece. As with the inside edges of the support extensions 36, 38, the cutting edges 70, 72, 74, 76 are preferably machined to a tolerance within plus or minus 0.001 inch (0.025 mm), heat treated to a hardness of about 58 Rockwell and then surface ground for sharpness.

The cutting edges 70, 74, as well as the cutting edges 72, 76, form an obtuse angle a therebetween. The obtuse angle α is preferably approximately 159 degrees when the cutting blade 16 is to be used to cut a workpiece such as the length 100 of DIN rail, but other angles may be suitable, especially to enable the cutting blade 16 to cut other workpieces. As is seen in FIG. 3, the cutting blade 16 is included within the obtuse angle α, such that if rays starting from the point 77 and extending to infinity along the cutting edges 72, 76 were drawn in the plane of FIG. 3, all of the figure formed by the intersection of the cutting blade 16 and the plane of FIG. 3 would be included between the rays. As will be fully appreciated from the description of the operation of the cutting blade 16 contained hereinbelow, the cutting edges 74, 76 need not extend to an end 78 of the cutting blade 16. The cutting edges 74, 76 could extend only partly toward the end 78 and terminate at a surface roughly parallel to the end 78, such that the cutting blade 16 would be formed as a right rectangular parallelopiped having a notch cut therein, with the cutting edges 74, 76 bounding one side of the notch. In such a case, the obtuse angle a formed by the edges 70, 74 and 72, 76, respectively, would include only a portion of the cutting blade 16.

The operator 18 includes a handle 80 having a grip 81, which handle 80 is pivotally attached to the front and back plates 20, 22 of the base 12 by means of a pin 82. The operator 18 further includes a pair of links 84, 86, respectively, the structure and operation of which are identical. The links 84, 86 are pivotally attached to the handle 80 by means of a pin 88 that is spaced a relatively large distance from the grip 81, and the links 84, 86 are pivotally and slidably attached (as will be discussed in more detail below) to the ram 14 by means of a pin 90 that extends within slots 92, 94 in the links 84, 86, respectively. The links 84, the pins 88, 90 and the slots 92,.94 thus act to pivotally and slidably connect the handle 18 to the cutting blade 16. The operator 18 further includes a protrusion 96 on the handle 18, the operation of which will be described hereinbelow.

With reference to FIGS. 1–7, the structure and operation of the cutting apparatus 10 will now be explained. When the cutting apparatus 10 is not in use it normally is in the position shown in FIG. 1, wherein the handle 80 is over-center with respect to the pin 82 and thus remains stationary, the pin 90 is resting against the bottoms of the slots 92, 94, and the cutting blade 16 is spaced from the die surfaces 42, 44. If an operator desires to cut a workpiece, such as a length 100 of DIN rail, the operator would normally place the workpiece across the die surfaces 42, 44, such that a desired length of the workpiece extends beyond the inside edge of the support extension 36.

The operator then would pivot the handle 80 clockwise about the pin 82 in FIG. 1. Because the pin 90 is supported against pivoting only by the bottoms of the slots 92, 94, the ram 14 and the cutting blade 16 also would pivot clockwise in FIG. 1 about the pin 50 until the cutting blade 16 contacted the workpiece. At that point, as shown in FIGS. 2–3, the cutting blade 16 and the ram 14 will discontinue their pivoting motion and the pin 90 will rise within the slots 92, 94 as the handle 80 continues to pivot. During this phase of movement f the handle 80, the motion of the handle 80 is lost until the tops of the slots 92, 94 contact the pin 90, since the movement of the handle 80 does not apply operating force to the cutting blade 16.

At that point, further pivoting of the handle 80 by the handle would force the cutting blade to begin to cut through the workpiece. Accordingly the first cutting edges 70, 72, through cooperation with the inside edges of the support extensions 36, 38, respectively, would shear through a first portion of the workpiece, until the cutting apparatus 10 reaches the position shown in FIG. 4. Thus, if the workpiece is the length 100 of DIN rail, the first cutting edges 70, 72 would shear through a first portion of the length 100 that would include a first flange 102, a first side 104 and about one-half of a base 106 of the length 100. The first cutting edges 70, 72 also would begin to create a scrap portion 108.

Figure 4:
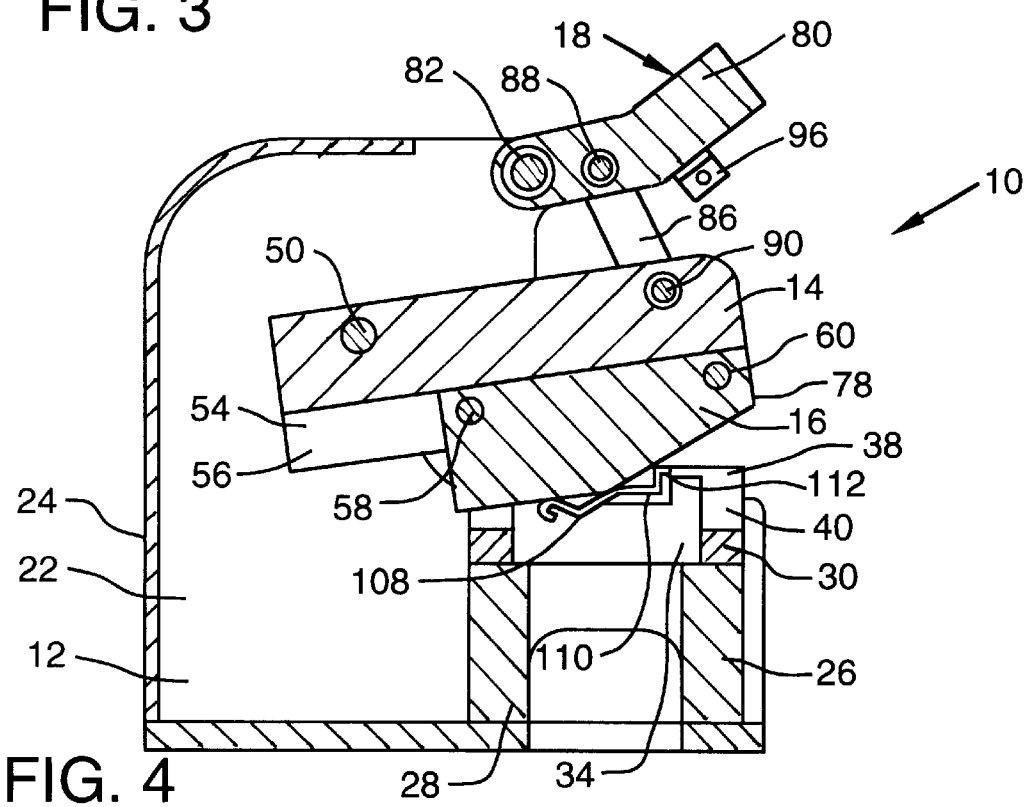
FIG. 4 is a cutaway side elevational view similar to FIG. 3, between first and second portions of the cut.

Once the cutting apparatus 10 reaches the position shown in FIG. 4, each of the first cutting edges 70, 72 would have finished its cut, and each of the second cutting edges 74, 76 would be in contact with the workpiece both at the transition point 75 and at a point spaced from the transition point 75. In other words, the location of the transition point 75, the size of the obtuse angle α and the relative locations of the cutting blade 16 and the support 30 are calculated for any particular workpiece such that the second cutting edges 74, 76 actually each contact and shear the workpiece at two separate locations at the same time during operation of the cutting apparatus 10 from FIG. 4 through FIG. 5. In this manner, the second cutting edges 74, 76 shear through a second portion of the workpiece. If the workpiece were the length 100, the second cutting edges 74, 76 would shear through a second portion of the length 100 that includes roughly the second half of e base 106, as well as a second side 110 and a second flange 112 of the length 100.

During cutting of the first portion of the workpiece, cutting force generally would be applied to the workpiece by the first cutting edges 70, 72 in directions normal to the cutting edges 70, 72, which.normal directions would vary over a first range as the cutting edges 70, 72 pivoted about the pin 50. During cutting of the second portion of the workpiece, the second cutting edges 74, 76 generally would apply cutting force to the workpiece in directions normal to the cutting edges 74, 76, which normal directions would vary over a second range as the cutting edges 74, 76 pivoted about the pin 50. The second range of normal directions generally would not be identical to the first range of normal directions over which the first cutting edges 70, 72 apply cutting force. Accordingly, while the second range and the first range may partially overlap for a particular arrangement of cutting blade and die surface locations designed for a particular workpiece, there would in general be at least one first direction among the first range of directions that would be different from at least one second direction among the second range of directions, due to the fact that the first cutting edges 70, 72 and the second cutting edges 74, 76 would be separated by the obtuse angle α.

Figure 5:
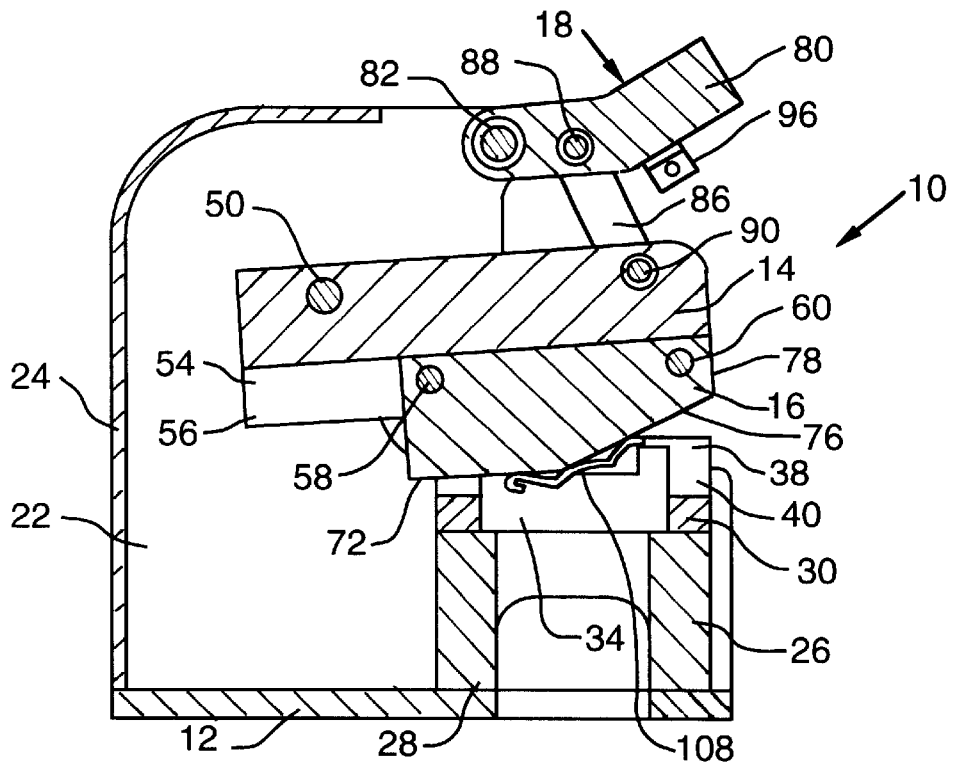
FIG. 5 is a cutaway side elevational view similar to FIG. 3, with the second portion of the cut almost completed.
Figure 6:
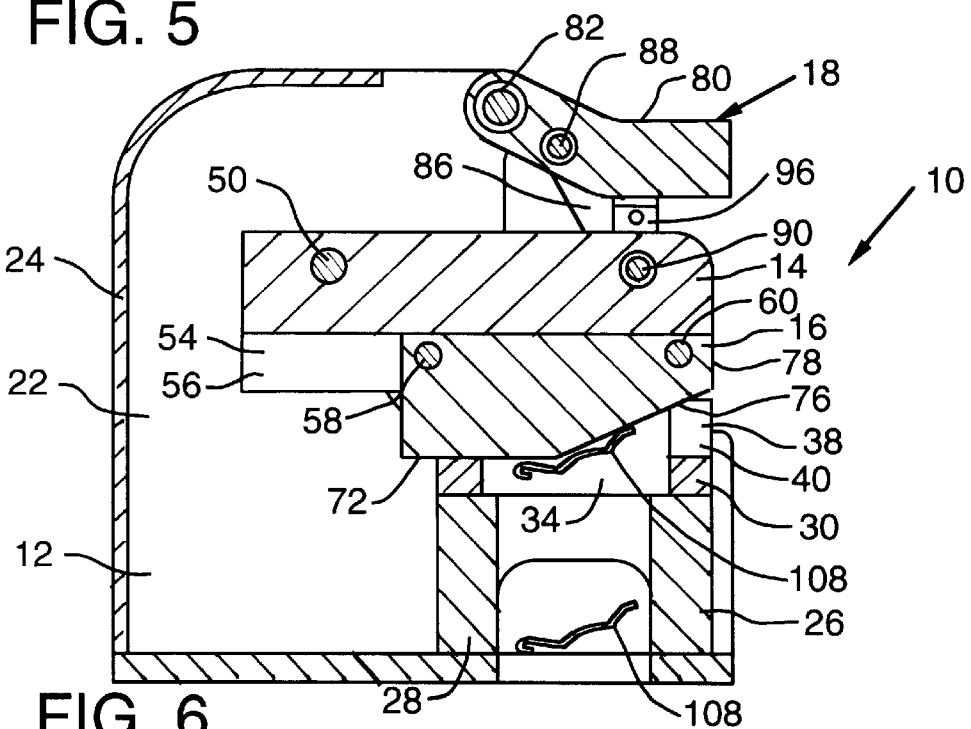
FIG. 6 is a cutaway side elevational view similar to FIG. 3, with the cut completed and the workpiece scrap being expelled.
Figure 7:
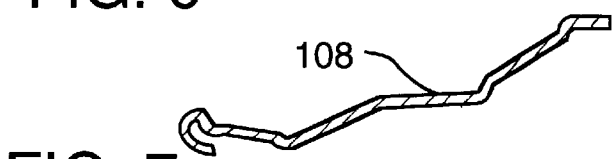
FIG. 7 is an enlarged cross-sectional view of the workpiece scrap.

Once the cutting blade 16 moves just past the position shown in FIG. 5, the workpiece has been completely cut and the piece of workpiece scrap 108 has been completely created. Without further clockwise motion of the cutting blade 16, however, a succession of scraps 108 tends to wedge between the support extensions 36, 38 and jam the cutting apparatus 10. The operator accordingly normally would continue clockwise pivoting of the handle 80, to push the scrap 108 into the slot 34 so that the scrap 108 falls between the support blocks 26, 28. However, as the cutting apparatus 10 approaches a position just past that shown in FIG. 6, further clockwise pivoting of the handle 80 would not further pivot the ram 14 and the cutting blade 16 because the tops of the slots 92, 94 would be drawn upwardly away from the pin 90. The lost motion feature of the handle 80 thus would prevent full ejection of the scrap 108. The protrusion 96 is thus provided on the handle 80 to contact the ram 14 directly during this lost motion phase and to apply force directly to the ram 14 and the cutting blade 16 to cause full ejection of the scrap 108 (seen in enlarged cross section in FIG. 7) from the support 30.

Thereafter, the handle 80 would be rotated counterclockwise about the pin 82 until the bottoms of the slots 92, 94 contact the pin 90. Further counterclockwise rotation of the handle 80 would cause the ram 14 and the cutting blade 16 to pivot counterclockwise about the pin 50 until the cutting apparatus is once again in the position shown in FIG. 1. The workpiece, such as length 100, would be cut to the desired length, and a small piece of workpiece scrap 108 would have been generated.

At least in part because the workpiece rests upon mating die structures, such as the die structures 42, 44 for the length 100 of DIN rail, relatively very little deformation of the workpiece occurs during cutting. At least in part because the inside edges of the support extensions 36, 38 and the cutting edges 70, 72, 74, 76 of the cutting blade 16 are machined to very close tolerances, and at least in part because the second cutting edges 74, 76 each cut through the second portion of the workpiece at two separate locations at the same time, the cut tends to be relatively very clean, even when short lengths are being cut or a length is being trimmed a very small amount. At least in part because the workpiece is supported only from below during cutting, an operator can clearly view where a cut will be made in the workpiece, and can relatively very accurately make precise cuts and trim small amounts from previously-cut lengths of workpiece. The cutting apparatus 10 of the-present invention has been found to be able to cleanly, accurately and with minimal deformation cut a length of a workpiece such as the length 100 of DIN rail to within 1/32" (0.8 mm), and has been found to be able to cleanly, accurately and with minimal deformation trim as little as 1/32" (0.8 mm) from a previously-cut length of workpiece such as the length 100 of DIN rail.

At least in part because the pin 88 is spaced a relatively large distance from the grip 81 and the handle 18 is connected to the ram 14 through the links 84, 86, the force applied by an operator to the handle 81 is multiplied, such that the force required of an operator of the cutting apparatus is relatively small. However, it should be understood that while the operator 18 is described herein as including a manual operator in the form of the handle 80 and the links 84, 86, a hydraulic operator could be used in the cutting apparatus of the present invention and at least some of the advantages of the present invention received therefrom. For example, a standard hydraulic piston and cylinder arrangement could be pivotally mounted to the base 12 and the ram 14 to pivot the cutting blade 16 through an entire cut during outward movement of the piston relative to the cylinder.

The principles, a preferred embodiment and the mode of operation of the present invention have been described in the foregoing specification. However, the invention which is intended to be protected is not to be construed as limited to the particular embodiment disclosed. The embodiment is therefore to be regarded as illustrative rather than restrictive. Variations and changes may be made by others without departing from the spirit of the present invention. Accordingly, it is expressly intended that all such equivalents, variations and changes that fall within the spirit and scope of the present invention as defined in the claims be embraced thereby.

What is claimed is:

1. A cutting apparatus for cutting a workpiece, comprising:
    a base, said base including a support to support the workpiece;
    a cutting blade pivotally connected to said base, said cutting blade including a pair of first cutting edges and a pair of second cutting edges, wherein each of said first cutting edges and each of said second cutting edges respectively meet at a transition point to form an obtuse angle such that a portion of said cutting blade is included within said obtuse angle; and
    an operator connected to said cutting blade to cause said cutting blade to change in angle relative to said base for cutting the workpiece, said operator including a link pivotally connected to said cutting blade and to said operator for multiplying the force applied to the workpiece by the operator.

2. A cutting apparatus as claimed in claim 1, wherein said first and second cutting edges are straight.

3. A cutting apparatus as claimed in claim 2, wherein said first and second cutting edges meet at a transition point to form an obtuse angle, wherein a portion of said cutting blade is included within said obtuse angle.

4. A cutting apparatus as claimed in claim 3, wherein said obtuse angle is approximately 159 degrees.

5. A cutting apparatus as claimed in claim 1, wherein said operator includes a handle pivotally attached to said base.

6. A cutting apparatus as claimed in claim 5, wherein said link is slidably and pivotally connected to said cutting blade 7. A cutting apparatus as claimed in claim 6, further including:
    a ram pivotally attached to said base, said cutting blade being fixed to said ram, said ram having a pin thereon and said link having a slot therein, said pin extending within said slot to slidably and pivotally connect said handle and said cutting blade, such that said handle moves during a lost motion movement thereof without applying an operating force to said cutting blade through said link.

8. A cutting apparatus as claimed in claim 7, wherein said handle includes a protrusion thereon to apply force directly to said cutting blade during at least a portion of said lost motion movement.

9. A cutting apparatus as claimed-in claim 1, wherein said support includes a slot to allow passage of workpiece scrap therethrough.

10. A cutting apparatus for cutting a workpiece, comprising:
    support means for supporting the workpiece;
    cutting means, pivotally connected to said support means to form a connection and pivotally connected to a link means to form a connection, said cutting means adapted to change in angle relative to said support means and to cut, the workpiece, said cutting means including first cutting means for cutting a first portion of the workpiece and second cutting means for cutting a second portion of the workpiece;
    operating means, pivotally connected to said link means to form a connection to said cutting means and pivotally connected to said support means to form a connection, said operating means adapted to operate said cutting means to cut the workpiece such that when the workpiece is supported by said support means and in contact with said cutting means and said operating means is pivoted about said support means, said first cutting means first cuts said first portion of the workpiece and, when said first portion of the workpiece is substantially cut, said second cutting means contacts said second portion of the workpiece at two separate locations to cut said second portion of the workpiece; and
    wherein said connection between said operating means and said link means and said connection between said operating means and said support means form a first distance therebetween and said connection of said cutting means to said link means and said connection of said cutting means to said support means form a second distance therebetween, wherein said first distance is less than said second distance.

11. A cutting apparatus as claimed in claim 10, wherein said first cutting means comprises means for applying a cutting force to the workpiece in at least a first direction and said second cutting means comprises means for applying a cutting force to the workpiece in at least a second direction.

12. A cutting apparatus as claimed in claim 10, wherein said first cutting means includes a pair of first cutting edges spaced from each other, and said second cutting means includes a pair of second cutting edges spaced from each other.

13. A cutting apparatus as claimed in claim 10, wherein said operating means includes means, pivotally connected to said support means, for manually operating said cutting means, and means for multiplying a manual force applied to said manual operating means.

14. A cutting apparatus as claimed in claim 13, wherein said force multiplying means includes lost motion means for allowing movement of said manual operating means without the application of an operating force to said cutting means through said force multiplying means.

15. A cutting apparatus as claimed in claim 14, wherein said manual operating means includes direct operation means for applying force directly to said cutting means during operation of said lost motion means.

16. A cutting apparatus as claimed in claim 10, wherein said support means includes means for allowing passage of workpiece scrap therethrough.

17. A cutting apparatus for cutting a workpiece, comprising:

a base, said base including a support to support the workpiece;

a cutting blade pivotally connected to said base to form a connection, said cutting blade adapted to change in angle relative to said base and said cutting blade including a first cutting edge and a second cutting edge, wherein said first cutting edge and said second cutting edge meet at a transition point to form an obtuse angle such that a portion of said cutting blade is included within said obtuse angle;

an operator connected to said cutting blade to operate said cutting blade to cut the workpiece including a link pivotally connected relative to said cutting blade to form a connection and pivotally connected relative to said operator to form a connection for multiplying the force applied to the workpiece by the operator; and wherein said connection between said operator and said link and said connection between said operator and said cutting blade form a first distance and said connection of said cutting blade to said link and said connection of said cutting blade to said base form a second distance, wherein said first distance is less than said second distance.

18. A cutting apparatus for cutting a workpiece, comprising:

a base, said base including a support to support the workpiece;

a cutting blade pivotally connected to said base to form a connection, said cutting blade adapted to pivot and change in angle relative to said base and said cutting blade including a pair of first cutting edges and a pair of second cutting edges, wherein each of said first cutting edges and each of said second cutting edges respectively meet at a transition point to form an obtuse angle such that a portion of said cutting blade is included within said obtuse angle;

an operator connected to said cutting blade to pivot the angle of said cutting blade relative to the workpiece, said operator including a link pivotally connected to said cutting blade to form a connection and pivotally connected to said operator to form a connection for multiplying the force applied to the workpiece by the operator; and wherein said connection between said operator and said link and said connection between said operator and said cutting blade form a first distance and said connection of said cutting blade to said link and said connection of said cutting blade to said base form a second distance, wherein said first distance is less than said second distance.

19. A cutting apparatus for cutting a workpiece, comprising:

a base, said base including a support to support the workpiece;

a cutting blade pivotally connected to said base and adapted to change in angle relative to said base, said cutting blade including a pair of first cutting edges and a pair of second cutting edges, wherein each of said first cutting edges and each of said second cutting edges respectively meet at a transition point to form an obtuse angle such that a portion of said cutting blade is included within said obtuse angle; and an operator connected to said cutting blade to operate said cutting blade to cut the workpiece.

20. A cutting apparatus for cutting a workpiece, comprising:

a base, said base including a support to support the workpiece;

an operator pivotally connected to said base; and a cutting blade pivotally connected to said operator, said cutting blade including a pair of first cutting edges and a pair of second cutting edges wherein said first and second pair of cutting edges respectively meet at transition points to form obtuse angles such that as said operator is pivoted about said base, when the workpiece is supported by said support, said pair of first cutting edges pivot relative to the workpiece and cut a first portion of the workpiece and said pair of second cutting edges pivot relative to the workpiece and contact and cut a second portion of the workpiece at two separate locations at the same time.

21. A cutting apparatus for cutting a DIN rail, comprising:

a base, said base including a support to support the DIN rail;

a cutting blade pivotally connected to said base and adapted to change in angle relative to said support, said cutting blade including a pair of first cutting edges and a pair of second cutting edges, wherein each of said first cutting edges and each of said second cutting edges respectively meet at a transition point to form an obtuse angle such that a portion of said cutting blade is included within said obtuse angle; and an operator connected to said cutting blade to operate said cutting blade to pivot relative to said base and cut the DIN rail, said operator including a link pivotally connected to said cutting blade and to said operator for multiplying the force applied to the DIN rail by the operator.

* * * * *